Patented Mar. 14, 1950

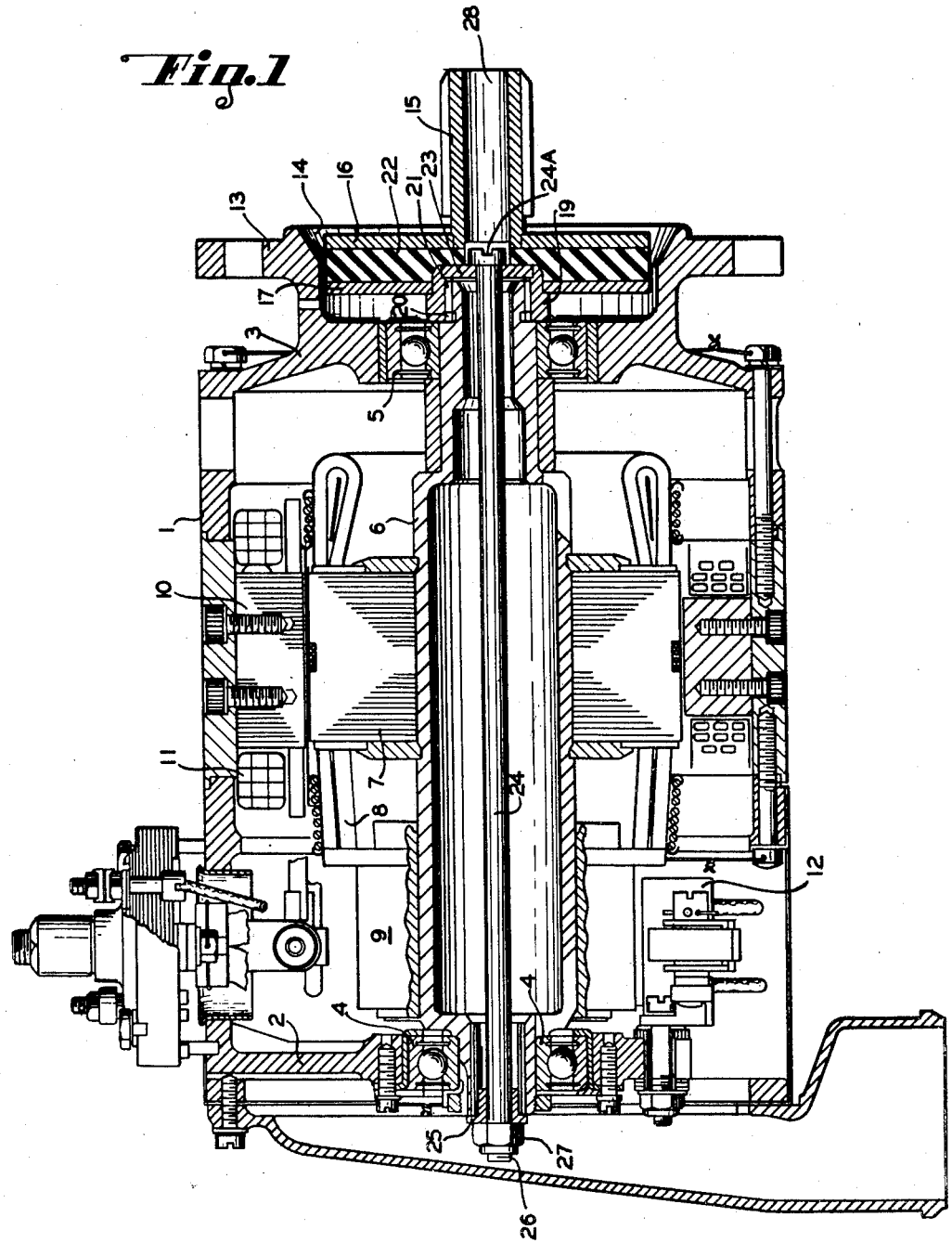

2,500,281

UNITED STATES PATENT OFFICE 2,500,281

FLEXIBLE GENERATOR DRIVE

William Francis Fell, Hasbrouck Heights, N. J., assignor to Bendix Aviation Corporation, Teterboro, N. J., a corporation of Delaware Application November 27, 1945, Serial No. 631,080

2 Claims. (Cl. 64—13)

The present invention relates to electrical apparatus and more particularly to engine driven generators of the type shown in my copending application Serial No. 505,688, filed October 9, 1943, and now U. S. Patent No. 2,411,781, granted November 26, 1946. An object of the invention is to provide an improved flexible generator drive and a drive shaft construction for damping the effects of engine vibration.

Another object of the invention is to provide in a generator, a simplified vibration damping means, including a driving member and a driven member and a rubber bonded connection between the two members for lessening the effects of engine vibration and a construction affording a flexible drive shaft for the generator.

Another object of the invention is to provide in a generator, a novel and compact assemblage including a drive shaft having a rubber bonded connection between the driving and driven portions thereof.

Other objects of the invention will become apparent from inspection of the following specification when read with reference to the accompanying drawing wherein is illustrated the preferred embodiment of the invention. It is to be expressly understood however, that the drawing is for the purpose of illustration only and is not designed as a definition of the limits of the invention, reference being had to the appended claims for this purpose.

The drawing is a longitudinal sectional view of a device embodying the invention.

The invention is shown in the drawing as incorporated in a cylindrical housing 1 having end bearing plates 2 and 3, respectively, to receive bearing assemblies 4 and 5 in which is rotatably mounted a hollow shaft 6. On the hollow shaft 6, there is mounted an armature 7 having a winding 8 of conventional type and a commutator 9. Pole pieces 10 project from the inner surface of the housing 1 and about the pole pieces 10 are suitable field windings 11 of conventional type. Spring bias brush members, one of which is shown at 12, are mounted on the end plate 2 and cooperate with the armature 9 in a manner well known in the art.

The foregoing structure is well known in the art and has been described in detail in my aforenoted copending application.

Projecting from the end plate 3 is a flange 13 for facilitating mounting of the unit on the wall or crankcase of the prime mover or engine. The flange 13 has formed therein a recess 14 for receiving my novel flexible drive shaft and engine vibration damping means. The latter means includes a splined end 15 suitably brazed to a novel front plate member 16 rotatably mounted within the recess 14 of the flange 13. A second or rear plate member 17 is also rotatably mounted in the recess 14 and is suitably brazed to an internally splined hub portion 19 having suitable internal teeth 20 drivingly engaging teeth 21 formed at the outer end of the hollow shaft 6. Disc 22 formed of a plastic material such as rubber and having suitable elastic properties is positioned between the plate members 16 and 17 and bonded at opposite sides to both plate members by vulcanization or other suitable means. The plastic disc 22 thus provides a flexible driving connection between the plate members 16 and 17.

A plate 23 is positioned in the end of the hub 19 and is connected by a bolt 24 with a collar 25 mounted in the opposite end of the hollow shaft 6. The bolt 24 has a cleft end 24A and a screw-threaded end 26 engaging a nut 27 so as to put the rod 24 under tension and thereby hold the hub 19 in operative relation. The cleft portion 24A is accessible through a channel 28 extending longitudinally in the splined end 15. Thus the flexible coupling may be readily fastened to the hollow shaft 6 by the insertion of a screw-driver in the channel 24A so as to tighten the bolt 24 and thereby operably connect the splined end 15 through the plastic rubber-like member 20 and hub 19 to the hollow shaft 6. The splined end 15 is arranged to receive a correspondingly splined driving shaft of an engine or other prime mover not shown. The flexible coupling assembly as will be readily seen from the drawing is compactly positioned within the recess 14 of the flange 13. In the operation of the assembly, it will be seen that the plastic connecting member 22 provides a convenient means for damping engine vibration and also affords a flexible driving means for the generator.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In a device of the class including a casing, a stator carried by the casing, and a main shaft rotatably mounted in the casing and carrying a rotor member; the improvement comprising said casing having a recess formed in the exterior surface thereof, a first plate drivingly connected to said main shaft and rotatably positioned in said recess, an auxiliary shaft, a second plate drivingly connected to said auxiliary shaft, a disc formed of a rubber-like material and bonded at opposite surfaces to said first and second plates for flexibly connecting said main and auxiliary shafts in driving relation, said auxiliary shaft having an opening in the end thereof, and means accessible through the open end of said auxiliary shaft for disconnecting said auxiliary shaft from driving relation with said main shaft.

2. In a device of the class including a casing, a stator carried by the casing, and a main shaft rotatably mounted in the casing and carrying a rotor member; the improvement comprising said casing having a recess formed in the exterior surface thereof, a portion of said main shaft projecting into said recess, external teeth formed on said main shaft, a first plate rotatably mounted in said recess, a hub portion affixed to said first plate, internal teeth provided in said hub portion for releasably engaging said external teeth, a second plate rotatably mounted in said recess, an auxiliary shaft affixed to said second plate, a disc formed of a rubber-like material and bonded at opposite surfaces to said first and second plates for flexibly connecting said main and auxiliary shafts in driving relation, said auxiliary shaft having a channel open at one end of said auxiliary shaft and extending longitudinally in said auxiliary shaft, a rod extending longitudinally through said main shaft for securing said hub in position, and said rod having a cleft portion at one end accessible through the open end of said auxiliary shaft.

WILLIAM FRANCIS FELL.

REFERENCES CITED

The following references are of record in the file of this patent:

UNITED STATES PATENTS

| Number | Name | Date |
|---|---|---|
| 2,361,226 | Miner, Jr., et al. | Oct. 24, 1944 |
| 2,437,954 | Havill | Mar. 16, 1948 |